United States Patent [19]
Pringle

[11] 3,814,860
[45] June 4, 1974

[54] SCANNING TECHNIQUE FOR MULTIPLEXER APPARATUS

[75] Inventor: Anthony Pringle, Framingham, Mass.

[73] Assignee: Honeywell Information Systems Inc., Waltham, Mass.

[22] Filed: Oct. 16, 1972

[21] Appl. No.: 298,078

[52] U.S. Cl..... 179/15 BA, 179/15 BW, 179/15 BV
[51] Int. Cl............................................. H04j 3/00
[58] Field of Search......... 179/15 A, 15 BA, 15 BV, 179/15 AL, 15 BS, 15 BW

[56] References Cited

UNITED STATES PATENTS

| | | | |
|---|---|---|---|
| 3,229,259 | 1/1966 | Barker | 179/15 BW |
| 3,389,225 | 6/1968 | Myers | 179/15 BW |
| 3,707,604 | 12/1972 | Greefkes | 179/15 BW |

*Primary Examiner*—Ralph D. Blakeslee
*Attorney, Agent, or Firm*—John S. Solakian; Ronald T. Reiling

[57] ABSTRACT

In a communications system comprising multiplexer apparatus for transferring data over any one of a plurality of communications lines, line scanning apparatus is provided to address and enable the transfer of data over any one of the communications lines, which lines are divided into groups characterized by the lines maximum frequency. The apparatus of the invention includes a main address counter which is used primarily to address low speed communication lines and thereby enable the transfer of data thereover, a sub scan counter which is utilized primarily to enable the transfer of data over high speed lines, and a medium speed counter which is utilized in combination with the other counters to address the medium speed lines under certain conditions.

21 Claims, 4 Drawing Figures

PATENTED JUN 4 1974 3,814,860

SHEET 1 OF 3

| QUADRANT | 1 | 2 |
|---|---|---|
| CLOCK COUNT | 1 2 3 4 5 6 7 8 9 10 11 12 13 14 15 16 | 17 18 19 20 21 22 23 24 25 26 27 28 29 30 31 32 |
| MAIN ADDRESS COUNTER | 1 2 3 4 5 6 7 8 9 10 11 12 13 14 15 16 | 17←→17 18 19 20 21 22 23 24 25 26 |
| MEDIUM SPEED COUNTER | 1 2 3 4 5 6 7 8 9 10 11 12 13 14 15 16 | 17 18 19 20 21 22 23 24 25 26 27 28 29 30 31 32 |
| SUB-SCAN COUNTER | 1 2 3 4 5 6 7 8 9 10 11 12 13 14 15 16 | 1 2 3 4 5 6 7 8 9 10 11 12 13 14 15 16 |
| LINE SCAN PATTERN | 1 2 3 4 5 6 7 8 9 10 11 12 13 14 15 16 | 1 2 3 4 5 6 17 18 19 20 21 22 23 24 25 26 |
| COUNTER SELECTED | ← MAIN ADDRESS → | ← SUB-SCAN → ← MAIN ADDRESS → |

Fig. 3A.

| QUADRANT | 3 | 4 |
|---|---|---|
| CLOCK COUNT | 33 34 35 36 37 38 39 40 41 42 43 44 45 46 47 48 | 49 50 51 52 53 54 55 56 57 58 59 60 61 62 63 64 |
| MAIN ADDRESS COUNTER | 27← | →27 28 29 30 31 32 33 34 |
| MEDIUM SPEED COUNTER | 1 2 3 4 5 6 7 8 9 10 11 12 13 14 15 16 | 17←→17 18 19 20 21 22 23 24 25 26 |
| SUB-SCAN COUNTER | 1 2 3 4 5 6 7 8 9 10 11 12 13 14 15 16 | 1 2 3 4 5 6 7 8 9 10 11 12 13 14 15 16 |
| LINE SCAN PATTERN | 1 2 3 4 5 6 7 8 9 10 11 12 13 14 15 16 | 1 2 3 4 5 6 17 18 27 28 29 30 31 32 33 34 |
| COUNTER SELECTED | ← SUB-SCAN | → ←→ (MEDIUM SPEED) ← MAIN ADDRESS → |

Fig. 3B.

SCANNING TECHNIQUE FOR MULTIPLEXER APPARATUS

BACKGROUND OF THE INVENTION

The present invention relates generally to communications systems and more particularly to multiplexer apparatus utilized in such systems for enabling the transfer of data over the respective communications lines coupled with the system.

In a communications system, which includes a data processor and a plurality of communication lines coupled with the processor, it is usually necessary to utilize multiplexer apparatus coupled therebetween. The multiplexer apparatus includes scanning apparatus which is utilized to enable the connection and thereby the transfer of data over one of the communication lines with the processor. When all of the communications lines are capable of handling or transferring data at one specified frequency, the problems in enabling such transfer are usually less complex than that situation where the communications lines are all capable of transferring data at different frequencies. For example, if all of the communication lines are capable of transferring data at one frequency, then the logic circuits utilized in the system may be selected and designed for that particular frequency so that any timing problems are eliminated insofar as the logic characteristics are concerned. If the communications lines are capable of transferring data at different frequencies, then the problems become more complex. Usually the need for different frequencies of transfer over the communications lines is established by the receiving or sending device's speed of transmission or reception characteristics or for example the frequency of communications lines such as telephone lines which are available. In a system having lines, each coupled for data transfer at different frequencies, one method of accommodating all lines is to design the system to accommodate the fastest frequency of data transfer. There are disadvantages in this approach in that the logic is more expensive and complex when it is designed for the high frequency rates and is not optimally utilized when the system is coupled for transfer of data over the slower communication lines. Also, considerable time is wasted when each line, no matter what its frequency of data transfer, is given the same period of time to transfer information. By enabling the lines, at intervals, dependent upon their frequencies, the logic may be designed not only to be suitable and efficient for all frequencies, but also, maximum utilization is made of the time of transfer over the communications lines, thereby reducing the costs of the total system.

It is accordingly a primary object of the invention to provide a scanning technique for multiplexer apparatus which technique is capable of enabling the transfer of data over communication lines of different frequencies in an efficient manner.

It is a further object of the invention to provide a scanning technique for multiplexer apparatus which is simplified and efficient in construction and which makes efficient use of the transfer time available over the communication lines.

SUMMARY OF THE INVENTION

The purposes and objects of the invention are satisfied by providing multiplexer apparatus for enabling a plurality of communication lines for transfer of data during a predetermined interval. The lines are divided into a plurality of lines which lines are grouped according to their frequency range. The lines of each group are capable of transferring data at only one of either first, second or third maximum frequencies. The first maximum frequency is lower than the second and the third maximum frequency is greater than the second maximum frequency. Coupled with the communication lines are first, second and third means for enabling the transfer of data over respectively the first, second and third groups of communication lines. The first means for enabling is coupled to transger data once during each predetermined interval whereas the second and third means for enabling such transfer are coupled to transfer data over the communication lines during the predetermined interval a number of times equal to the ratio produced by dividing respectively the second maximum frequency or the third maximum frequency by the first maximum frequency. Thus, in a system including three maximum frequencies each being double the frequency of the next lowest maximum frequency, the lowest frequency lines are enabled to transfer data once during each interval, the medium frequency lines would be enabled to transfer data twice during each interval and the highest frequency lines would be enabled to transfer data over the communications lines four times during each interval. A unique system of counters and control logic and a simplified configuration technique are implemented in an efficient manner to provide the scanning technique of the invention.

BRIEF DESCRIPTION OF THE DRAWINGS

The advantages of the foregoing configuration of the invention will become more apparent upon reading the accompanying detailed description in connection with the drawings, in which:

FIGS. 3A and 3B together form a state diagram illustrating the operation of the apparatus of the invention, for a typical configured system.

DETAILED DESCRIPTION OF THE PREFERRED EMBODIMENTS

Figure 1:
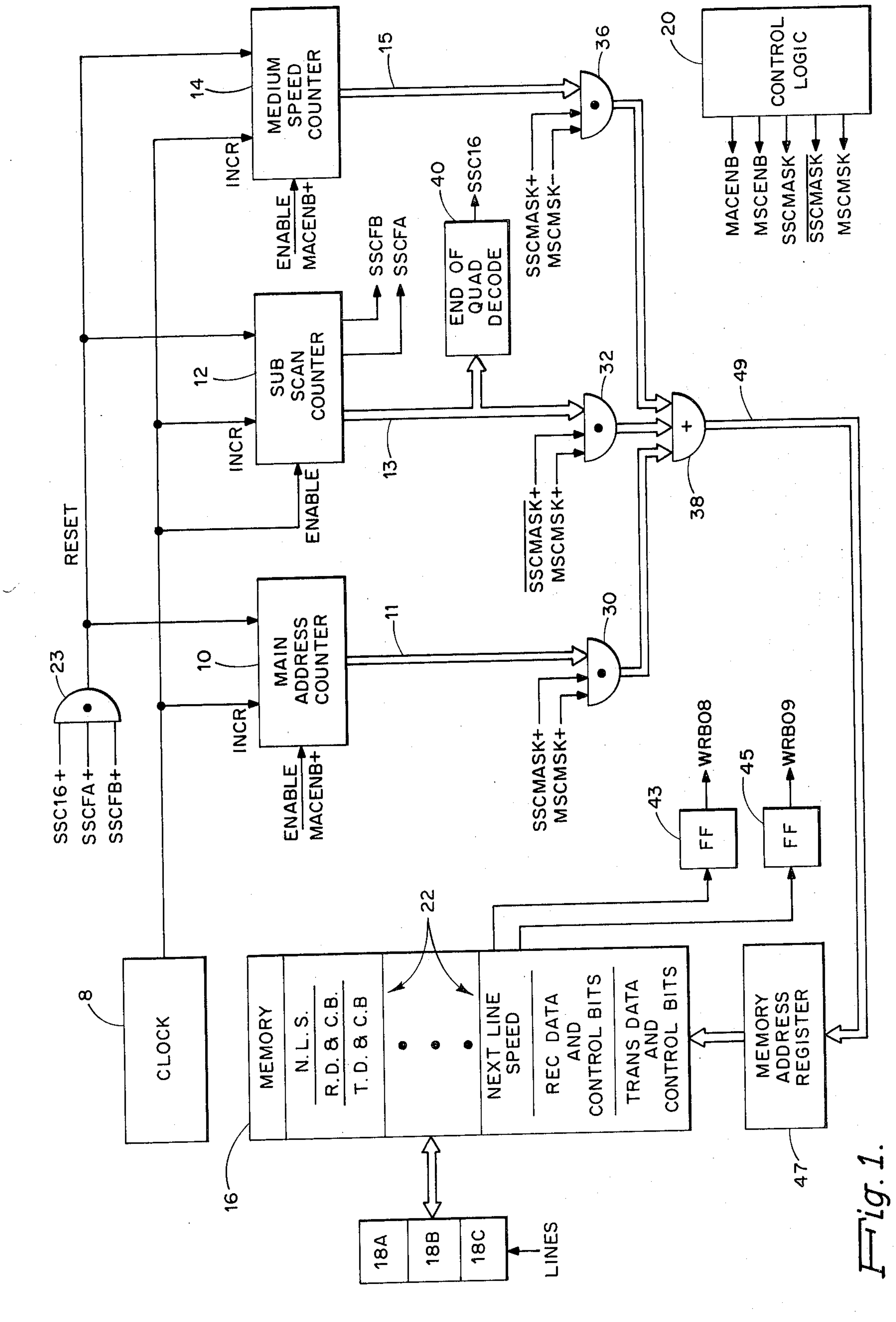
FIG. 1 is a logic diagram illustrating the multiplexer apparatus scanning technique of the present invention.

Now referring to FIG. 1 there is shown the multiplexer scanning apparatus of the present invention. The scanning apparatus includes a memory 16 which is coupled to transmit or receive data over a plurality of lines 18. The lines 18 are herein shown in three groups, 18A, 18B, and 18C depicting lines having the capability of different maximum speeds for transferring data. For the purposes of discussion, lines 18A are capable for transmitting data at a first maximum frequency and similarly lines 18B and 18C are capable of transmitting data respectively at second and third maximum frequencies, the third maximum frequency being the highest and the first maximum frequency being the lowest. Memory 16 includes a plurality of locations 22 at least equal in number to the number of lines 18. Each location 22 of memory 16 may include information relative to the received data, the data to be transmitted, control bits and information as to the speed of the next line to be scanned by the apparatus of the invention. That is, each location 22 includes at least three sublocations which have respectively data which is to be transmitted when the particular location 22 is scanned, i.e., enabled, or includes a sublocation which is capable of receiving data from the lines 18 when that location is scanned. The speed of the next line is also included in the sublocation for each line, and this information is transferred into flip-flops 43 and 45, thereby generating control signals WRBO8 and WRBO9. Also coupled to memory 16, may be a memory address register 47 which is coupled to receive an address which address then enables one of the particular locations 22 in memory 16 so that data may be transferred over the addressed lines. The location address is received by register 47 via OR gate 38 and via AND gates 30, 32, and 36 from a main address counter 10, a sub scan counter 12 and a medium speed counter 14. The register 47 is not required if one considers the selected counters 10, 12 or 14 as the address counter.

A clock 8 is coupled to provide clock pulses which increment each of the counters 10, 12 and 14 when enabled. Sub scan counter 12 is enabled by the clock pulses and is also incremented thereby, whereas main counter 10 and medium speed counter 14 are incremented only upon receipt of control signals from control logic 20 as specifically shown in FIG. 2. Main counter 10 is a six-bit counter which generates an address on lines 11 which address is capable of addressing for example up to 64 lines. The main function of counter 10 is to enable the selection of the low speed lines 18A. Sub scan counter 12 is also a six-bit counter which generates a four bit address on lines 13 in order to address for example up to sixteen of the high speed lines 18C. The fifth bit generated by sub scan counter 12 is the SSCFA signal whereas the sixth bit generated is the SSCFB signal, which signals are respectively utilized to indicate that the first four bits of counter 12 have been reset. These signals as discussed hereinafter indicate the respective intervals or quadrants of a complete scan cycle or interval. When the four bits on line 13 are each in a binary ONE state, this is decoded by the end of quadrant decode circuit 40 which may be simply an AND gate thereby generating the binary ONE state of the end of quadrant signal SSC16. Medium speed counter 14 generates a five bit address on lines 15 and counter 14 is used particularly to address up to for example 32 of the medium speed lines during the scan interval. It will be seen that counter 14 is utilized to enable medium speed lines only under certain conditions. The addresses generated by each of the counters are gated via their respective AND gates 30, 32 and 36 and OR gate 49 so that their respective like significant bits coincide.

The addresses on lines 11, 13 and 15 are received on line 49 depending upon which of the AND gates 30, 32 or 36 is enabled by the respective states of the control signals MSCMSK, SSCMASK and $\overline{\text{SSCMASK}}$ as shown, the plus (+) sign indicating that a binary ONE state will enable the device whereas the minus (−) sign indicates that a binary ZERO state will enable the device. The address on line 49 is then received by register 49 which then addresses and enables one of the locations 22 in memory 16. Then, depending upon the operation, data is either received or transmitted over the addressed line of lines 18.

As generally indicated hereinbefore the apparatus of the present invention will be explained with reference to a system which interfaces with up to 64 lines 18. The lines may be either high speed, medium speed, or low speed or may be a combination of such speeds. There may be up to 64 low speed lines utilized with the system if there are no high speed or medium speed lines used. Or, there may be up to 32 medium speed lines utilized with the system if there are no low speed or high speed lines. Further, there may be up to 16 high speed lines used if there are no low speed or medium speed lines. Thus, each of the medium speed lines takes the place of two low speed lines whereas each of the high speed lines takes the place of four low speed lines. For purposes of illustration the low speed lines may transmit or receive data in a frequency range whose maximum frequency is 2,700 bits per second; whereas the medium speed lines may transfer data at a maximum frequency of 5,400 bits per second and whereas the high speed lines may transfer data at the highest frequency of for example 10,800 bits per second. Thus, there is a two to one and four to one relationship of the frequencies of the respective lines. It is therefore noted that the frequency of transfer is at one of three maximum frequencies regardless of the frequency desired for a particular line. For example, in the highest frequency case of from greater than 5,400 bits per second to 10,800 bits per second, if the frequency of data transfer of a particular line is 9,000 bits per second, it will actually be transferred at the maximum frequency of 10,800 bits per second. It can also be seen therefore that the frequency grouping of various lines may be more or less than the three frequency groupings shown and that the number of lines coupled with the present apparatus may be more or less than the 64 lines shown for purposes of illustration.

During one complete scan of the lines, the high speed lines must be enabled four times at substantially equal intervals whereas the medium speed lines must be enabled two times during the complete scan. The low speed lines need only be enabled or serviced once during an entire scan of all the lines. Thus, the apparatus of the present invention utilizes a scanning technique which for purposes of illustration divides the complete scan into four subintervals or quadrants. It should be understood that there may have been a different number of subintervals without departing from the scope of the invention. During each quadrant, the high speed lines are serviced once. During the first and third quadrants, the medium speed lines are serviced and the low speed lines are serviced in the available sequence which remains after the high speed and medium speed lines are serviced. Each time the counters are incremented by clock 8, one location 22 in memory 16 is enabled for a duration of time sufficient to enable the transfer of data. Main counter 10 is incremented 64 times before it resets itself automatically whereas medium speed counter 14 is incremented 32 times before it resets itself automatically. Sub scan counter 12 is similar to main counter 10 in that it completely resets itself after being incremented 64 times. The counters may also be reset by a binary ONE state received from an enabling AND gate 23 at the end of the fourth quadrant in order to insure proper initial conditions.

As is well known, the least significant four bits of counter 12 reset themselves four times during the 64 increments of the counter 12. Thus, each time the least significant four bits of counter 12 are reset, 16 increments or counts of counter 12 has occurred. Each of the 16 counts define a quadrant. After the first 16 counts, the fifth bit (SSCFA) goes to the binary ONE state whereas after the second 16 counts, the fifth bit (SSCFA) goes to the binary ZERO state and the sixth bit (SSCFB) goes to the binary ONE state and so on until all bits are reset at the end of the fourth quadrant. At the end of each quadrant the four bits on line 13 are binary ONES which then generates the SSC16 signal. At the beginning of the second quadrant, the SSCFA signal is in the binary ONE state which indicates along with the fact that the SSCFB signal is in the binary ZERO state that this is the second quadrant. The first quadrant is indicated when both SSCFA and SSCFB signals are in the binary ZERO state. At the beginning of the third quadrant the SSCFA signal is in the binary ZERO state and the SSCFB signal goes to the binary ONE state indicating that this is the third quadrant. At the beginning of the fourth quadrant, the SSCFA and SSCFB signals are both in the binary ONE state indicating that this is the fourth quadrant. The counters 10 and 14 are normally enabled to increment, except when the sub scan counter 12 is addressing memory 16 in which case counters 10 and 14 may be halted so that when reenabled, the line after the last line enabled by their respective addresses may be so enabled.

Each of the high speed lines is enabled, that is, serviced first in each quadrant after which the medium speed lines and low speed lines are serviced in the available remaining time. As an example of a line scan pattern, we may assume for purposes of illustration a system in which there are six high speed lines, 12 medium speed lines and 16 low speed lines. The resultant line scan pattern is shown in detail in FIGS. 3A and 3B. By the end of the first quadrant, the six high speed lines and ten of the medium speed lines are serviced. By the end of the second quadrant, the six high speed lines have been serviced again, and the two remaining medium speed lines have been serviced. Also eight of the low speed lines are serviced. By the end of quadrant three, the six high speed lines are serviced again, and 10 of the medium speed lines are serviced. By the end of the fourth quadrant, the six high speed lines are each serviced a fourth time whereas the remaining two medium speed lines are serviced again and the eight remaining low speed lines are serviced. Thus, at the end of four quadrants, i.e., at the end of a complete line scan, the six high speed lines are serviced four times each, the twelve medium speed lines are serviced twice each, whereas the 16 low speed lines are each serviced once. It can be seen that the main address counter 10 is sometimes utilized to address each type of line whereas the sub scan counter 12 may be utilized to address the high speed and medium speed types of lines. The medium speed counter, it will be seen, is only enabled to address the memory 16 during the fourth quadrant if the total number of high speed and medium speed lines is greater than 16. During this time, the respective counters have been enabled in order to keep track of the appropriate addresses. Each of the counters 10, 12 and 14 are reset at the end of the fourth quadrant, and a complete scan is again made.

Figure 2:
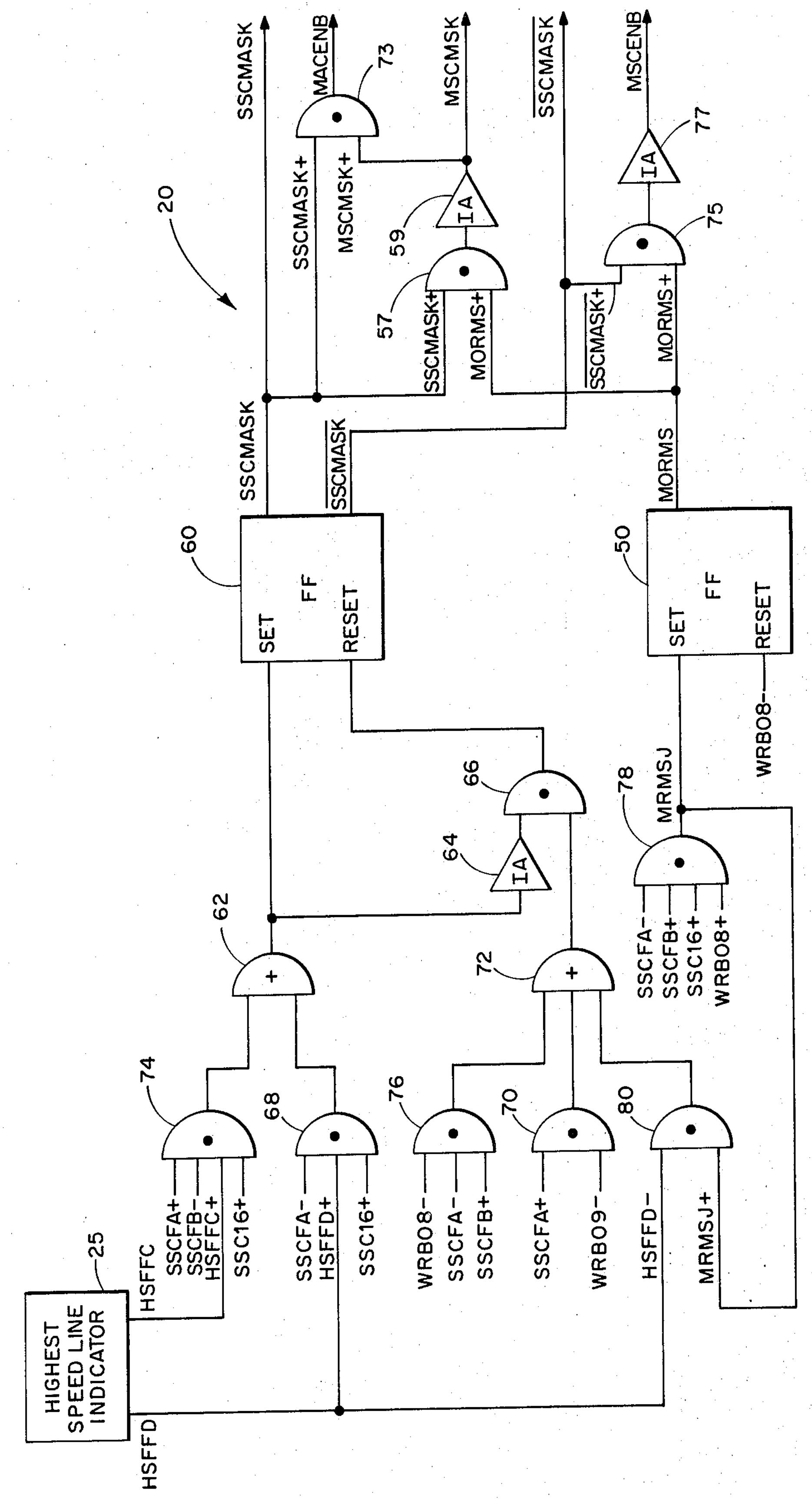
FIG. 2 is a logic diagram illustrating the control logic of FIG. 1.

The implementation of the control logic 20 is specifically shown in FIG. 2. In general, the main address counter 10 is able to count from 1 to 64 (in actuality the counter increments from 0 to 63 after which it resets to 0, however for purposes of illustration it will be assumed that each of the counters after being reset indicate a 1 thereby designating line 1) and counter 10 is associated as stated hereinbefore with the low speed lines. Counter 10 may be halted by the control logic 20 to remember the next low speed line to be serviced. The sub scan counter 12 is associated with the high speed lines and counts (least significant four bits) from 1 to 16 during each of the four quadrants. Associated with the counter 12 are the two signals SSCFA and SSCFB which indicate the four quadrants. The medium speed counter 14 counts from 1 to 32 and may be halted in a similar manner as the main address counter 10.

Generally in operation, the main address counter 10 is always selected in the first quadrant and increments from a count of 1 to 16. Simultaneously the sub scan counter 12 also counts from 1 to 16. In order to simplify the logic of the system, the high speed lines receive the lowest number designations, that is the high speed lines are designated numbers 1 though in this example 6 where we have six high speed lines, and the medium speed lines are than designated with the next numbers 7 through 18 in sequence for the twelve medium speed lines. The low speed lines receive the subsequent number designations. At the end of the first quadrant, if there are any high speed lines in the system, the sub scan counter 12 will be selected at the next count. Also at this point the main counter 10 is halted and the least significant bits of the sub scan counter 12 are automatically reset. In this way, the high speed lines are scanned and the next medium speed line or low speed line count is remembered. During the second quadrant the sub scan counter 12 remains in control until it is sensed that the next line is not a high speed line as indicated by the WRBO8 and the WRBO9 signals. The WRBO8 and the WRBO9 signals have respectively the following binary states: for low speed lines 0, 0; for medium speed lines 1, 0; and for high speed lines 1, 1. The main counter is then selected if the next line is not in the high speed range. At the end of the second quadrant if there are either high speed or medium speed lines, the sub scan counter 12 will be selected for enabling lines at the start of quadrant three and the main counter 10 will be halted. During the third quadrant, the sub scan counter will remain in control until the WRBO8 signal indicates that the next line is not a high speed or a medium speed line. It should be pointed out at this point that for most configurations, the sub scan counter will handle or, that is, enable both the medium speed and high speed lines so that the medium speed counter will never have to be selected via AND gate 36, unless the number of high speed and medium speed lines in combination is greater than 16. Generally at the end of the third quadrant, the main counter 10 is again halted and the sub scan counter 12 is selected to scan the high speed lines at the start of the fourth quadrant. As indicated hereinbefore however, if the total number of high speed and medium speed lines is greater than 16 as in our example, then the medium speed counter is required. If this is the case, there will be some medium speed lines to service in the fourth quadrant after the high speed lines are serviced first. Under these conditions, the sub scan counter 12 is selected for the entire third quadrant. At the start of the fourth quadrant the sub scan counter automatically resets and services the high speed lines, the medium speed counter being halted at that time. The control logic remembers the fact that there are more medium speed lines to service. When the WRBO9 signal indicates that the next line is not a high speed line, the medium speed counter 14 is selected and addresses memory 16 until the WRBO8 signal indicates that the next speed is a low speed line. Finally, the main address counter 10 will address the remaining low speed lines to be enabled by the transfer of data.

In further explanation, with reference to FIG. 2, there is shown the control logic 20 which generates the SSCMASK, $\overline{\text{SSCMASK}}$, MACENB, MSCMSK and MSCENB signals. As indicated hereinbefore, the signals are denoted with either a plus or minus sign thereafter. The plus (+) sign indicates that a binary ONE state of the signal enables the gate or counter as the case may be and the minus (−) sign indicates that a binary ZERO state enables the respective device. For example, in FIG. 2, AND gate 80 is enabled by the binary ZERO state of the HSFFD signal and the binary ONE state of the MRMSJ signal. The MACENB+ signal is utilized to enable main counter 10 whereas the MSCENB+ signal is utilized to enable medium speed counter 14. The states as indicated in FIG. 1 of the MSCMSK and the SSCMASK signals are utilized to enable one of gates 30, 32 or 36.

Logic 20 includes flip-flop 60 which when reset generates the binary ONE state of SSCMASK signal, thus termed as the SSCMASK+ signal. Another flip-flop 50, when set, generates the binary ONE state of the MORMS signal. At the beginning of the first quadrant, that is under initial conditions, the MACENB and the MSCENB signals are in the binary ONE state. The main address counter 10 and the medium speed couner 14 are thereby enabled, and counters 10 and 14 are incremented at the clock 8 rate, as is the sub scan counter 12, which is enabled by the clock itself. Also under initial conditions, the SSCMASK signal is in the binary ONE state and the MSCMSK signal is in the binary ONE state thereby enabling AND gate 30 and allowing main counter 10 to address memory 16 via register 47 and OR gate 38. The SSCMASK signal is in the binary ONE state because the flip-flop 16 has been initially reset at the end of the fourth quadrant. The flip-flop 50 is also initially reset thereby generating a binary ZERO state at the input of AND gate 57 and a binary ONE at the output of inverting amplifier 59. Accordingly, during the first clock count and as seen by the example stated hereinbefore, and as particularly seen in the state diagram of FIGS. 3A and 3B, the main address counter 10 has an output count of one on its lines 11, the medium speed counter and the sub scan counters also indicate a count of one and the first line is enabled to transfer data over the first high speed line. The counter selected is the main address counter 10. This condition remains, that is, the main address counter 10 is selected and the count increments to 16 during the first quadrant. During this time, the six high speed lines, that is, lines 1 through 6 are enabled for transfer of data, and ten of the twelve medium speed lines, namely lines 7 through 16 are enabled.

At the end of the first quadrant, the SSCMASK signal goes to the binary ZERO state. This happens because flip-flop 60 has been set. Flip-flop 60 has been set via OR gate 62 because AND gate 68 has been enabled. It is noted that the enabling of either AND gate 68 or 74 disables AND gate 66 by means of the inverting amplifier 64. AND gate 68 is enabled because the highest speed line indicator 25 indicates that it is a high speed line and because of the generation of the SSCFA− and SSC16+ signals. The indicator 25, which may be two flip-flops, has initially stored therein the speed of the fastest line. In the example, the fastest line is a high speed line and accordingly the HSFFC and the HSFFD signals are in the binary ONE state. The HSFFC and the HSFFD have also respectively the following binary states: for low speed lines 0, 0; and for medium speed lines 0, 1. The SSCFA− signal indicates that this is either the first or third quadrant whereas the SSC16+ signal indicates that it is the end of the quadrant. Because flip-flop 60 is set, the MACENB signal goes to the binary ZERO state because of the disabling of AND gate 73. Accordingly, the main counter 10 is halted.

Thus at the beginning of quadrant two, the main address counter 10 is disabled and the sub scan counter 12 is selected to address memory 16 by the enabling of AND gate 32. Accordingly, at the beginning of quadrant two, the clock pulses have incremented the main counter 10, the medium speed counter, and the sub scan counter 16 times and the line scan pattern indicates that the first six lines, that is, line numbers 1 through 6, have been enabled by means of the sub scan counter. When it is sensed that the next line to be enabled is not a high speed line, then gate 70 is enabled bcause of the WRBO9− signal and because of the SSCFA+ signal, which indicates that this is the second quadrant. Accordingly, since AND gate 70 is enabled, flip-flop 60 is reset via OR gate 72 and the enabling of AND gate 66. Note that the other inputs to AND gate 66, that is the output of inverting amplifier 64, is now in the binary ONE state because neither of the conditions for enabling either AND gates 68 or 74 are fully satisfied. Accordingly, by resetting flip-flop 60, the SSCMASK signal goes to the binary ONE state. The binary ONE state of both the SSCMASK signal and the MSCMSK signal then enables the addressing of memory 16 via main address counter 10. The MACENB signal also goes to the binary ONE state because of the enabling of AND gate 73.

During the first seven clock counts of the second quadrant, that is, clock count numbers 17 through 23, the main address counter indicates the address 17. The medium speed counter 14 indicates the address 23 at the seventh count of the second quadrant, whereas the sub scan counter indicates the address 7. Accordingly, since the main address counter 10 is selected, line number 17 is enabled. Main address counter 10 continues to be enabled during the remaining portion of quadrant two at the end of which communication line 26 is enabled. It is noted that lines 17 and 18 are the remaining two medium speed lines which could not be enabled during the first quadrant. Lines 19 through 26 are the first eight low speed lines. It will be seen that the remaining eight low speed lines will be addressed at the end of the fourth quadrant.

At the end of the second quadrant, if there are either high speed or medium speed lines, the sub scan counter 12 will address the memory 16 and the main counter 10 will be halted at the address 27. This is because the flip-flop 60 has been set. Flip-flop 60 is set because AND gate 74 has been enabled. AND gate 74 is enabled because of the generation of the SSCFA+ signal and the SSCFB− signal which indicate that it is the second quadrant, the SSC16+ signal which indicates that it is the end of the quadrant, and the HSFFC+ signal which indicates that all the lines are not low speed. Because the SSCMASK signal is in the binary ZERO state, this disables AND gate 73 and accordingly the state of the MACENB signal is the binary ZERO state thereby halting the main address counter 10. Thus at the beginning of the third quadrant, the sub scan counter 12 is enabled via AND gate 32 to address memory 16. The main address counter has been halted. As the clock count increments from 33 to 48, both the sub scan counter and the medium speed counter increment from one to 16 whereas the main address counter has been halted at the count of 27. The lines enabled by the sub scan counter 12 are the high speed lines 1 through 6 and the first 10 medium speed lines, namely lines 7 through 16.

At the end of the third quadrant, AND gate 68 is again enabled because the fastest line is a high speed line and because this is the end of the third quadrant, thereby setting flip-flop 60 and causing the $\overline{\text{SSCMASK}}$ signal to go to the binary ONE state thereby partially enabling AND gate 75. Also at the end of quadrant three, AND gate 78 is enabled because of the generation of the SSCFA− and the SSCFB+ signals which indicate that this is the third quadrant, because of the SSC16+ signal which indicates that it is the end of the third quadrant, and because the next line is either medium speed or high speed as indicated by the WRBO8− signal. The enabling of AND gate 78 partially enables AND gate 80 to be discussed hereinafter and sets flip-flop 50 thereby generating the binary ONE state of the MORMS signal thereby fully enabling AND gate 75 and causing a binary ZERO state to be generated at the output of inverting amplifier 77. The MSCENB− signal thereby causes the medium speed counter to be halted. Since the $\overline{\text{SSCMASK}}$ signal is in the binary ONE state and because AND gate 57 is disabled, the MSCMSK signal is in the binary ONE state, AND gate 32 is enabled, and the sub scan counter 12 is selected at the beginning of quadrant four, thereby allowing sub scan counter 12 to address memory 16. At the beginning of quadrant four, the first six lines, that is the high speed lines, are enabled. During the enabling of the lines 1 through 6 in the fourth quadrant, the clock count has advanced from 49 to 54, the main address counter 10 remains halted at the count of 27 and the sub scan counter counts from 1 to 6 thereby addressing memory 16 and enabling lines 1 through 6. The medium speed counter remains halted at line 17.

When it is sensed that the next line is not a high speed line, AND gate 70 is enabled because of the binary ZERO state of the WRBO9 signal and the binary ONE state of the SSFCA signal indicating that this is the fourth quadrant. This resets flip-flop 60 causing the SSCMASK signal to go to the binary ONE state. Since the MORMS signal remains in the binary ONE state, accordingly AND gate 57 is enabled and the MSCMSK signal goes to the binary ZERO state. Accordingly, with the signals MSCMSK− and SSCMASK+, AND gate 36 is enabled and allows the medium speed counter 14 to address memory 16. Also at the time that gate 36 is enabled, the MSCENB signal goes to the binary ONE state allowing counter 14 to increment. This happens because the binary ZERO state of the $\overline{\text{SSCMSK}}$ signal disables AND gate 75 causing a binary ONE state to appear at the output of inverting amplifier 77. Thus, after it is sensed that the next line is not a high speed line in the fourth quadrant, in the above-mentioned example, the medium speed counter is selected, and it addresses medium speed lines 17 and 18. At the same time, sub scan counter 12 increments to the count of 8 corresponding to the clock count of 56. Thus it is seen how the medium speed counter has been halted at the end of the third quadrant thereby allowing the medium speed counter to address the remaining two medium speed lines in the fourth quadrant.

When it is sensed that the next line to be enabled is neither a high speed nor a medium speed line, that is, that the next line is a low speed line, flip-flop 50 is reset by the WRBO8− signal thereby disabling AND gate 57 to produce the binary ONE state of the MSCMSK signal and accordingly enabling along with the MSCMSK+ signal, the AND gate 30 so that the main address counter 10 may address memory 16. At this time the MSCENB signal is in the binary ONE state allowing the medium speed counter 14 to continue incrementing along with the sub scan and main address counters. Since the main address counter is the counter selected, the remaining eight low speed lines, numbers 27 through 34, are enabled during the remainder of the fourth quadrant.

Thus it has been seen how the combination of high speed, medium and low speed lines in a given system may be scanned or enabled over a complete scan cycle by the implementation of three counters coupled to address a memory 16 as determined by the control logic 20, in response to signals such as the high speed line indicator signals which are predetermined for the particular system configured, the next line speed indicator signals which may change for each line, the end of quadrant and quadrant number signal indicators, etc. Gate 80 as mentioned hereinbefore is partially enabled when gate 78 is enabled at the end of the third quadrant when the next line is either a medium speed or a high speed line. The other input to gate 80, HHFFS−, indicates that there are no high speed lines. Accordingly, if gate 80 is to be enabled, then gate 78 must have been enabled because the next line was a medium speed line. In this event, the enabling of AND gate 80 at the end of the third quadrant enables AND gate 66 thereby resetting flip-flop 60 thereby causing the SSCMASK signal to go to the binary ONE state. In such case then, rather than selecting the sub scan counter 12 at the beginning of the fourth quadrant, the main address counter 10 is selected in order to address the medium speed and the remaining low speed lines. Also in order to allow the scanning apparatus of the present invention to be universal to all high speed, medium speed and low speed line combinations, the AND gate 76 is included which AND gate 76 when enabled also resets flip-flop 60. AND gate 76 is enabled if during the third quadrant the next line is neither a high speed nor a medium speed line, that is, that the next line is a low speed line. If this is the case, then since flip-flop 60 is reset, the SSCMASK signal is in the binary ONE state and with the MSCMSK+ signal, allows main address counter 10 to address memory 16 rather than the sub scan counter 12. It can be seen that any combination of lines may be utilized in the system. For example, if there are no high speed lines in the system, then since flip-flop 60 is reset initially and since flip-flop 50 is set initially, the SSCMASK signal is in the binary ONE state and the MSCMASK signal is also in the binary ONE state. This enables addressing of memory 16 by means of main address counter 10 during each quadrant. For example, flip-flop 60 cannot be set because gate 74 is not enabled at the end of the second quadrant since all lines are low speed and since gate 68 is not enabled at the end of the first and third quadrants because the fastest line is not high speed. If all lines are high speed, then during the first quadrant the main address counter will enable the 16 high speed lines, mainly lines 1 through 16. At the end of the first quadrant, control will be taken by the sub scan counter 12 by the setting of flip-flop 60 since gate 74 is enabled. Once the flip-flop 60 is set thereby enabling the sub scan counter 12 to address memory 16, it is not reset and the sub scan counter 12 continues to address memory 16 thereafter during the remaining quadrants. This can be seen by the fact that gate 76 cannot be enabled during the third quadrant because the next line would of necessity have to be a high speed line. Also, gate 70 and gate 80 cannot be enabled because there are high speed lines.

Thus, it has been seen that the multiplexer scanning apparatus of the invention enables different speed lines in any combination in a scan cycle by means of simplified electronics whose speed is not basically determined by the speed of the line to be enabled. It has been seen that the configuration of the various lines in connection with the apparatus of the invention may be configured in any way from one extreme of all high speed lines, all low speed lines, or all medium speed lines or any combination thereof since the apparatus of the invention is configurable and universal to any such configurations.

Accordingly, having illustrated the invention in its preferred embodiment.

What is claimed as new and novel and for which it is desired to secure letters patent is:

1. Multiplexer apparatus for enabling a plurality of communication lines for transfer of data during a predetermined interval, said lines included in groups wherein a first group of said lines is capable of transferring data at a first maximum frequency, a second group of lines is capable of transferring data at a second maximum frequency, and a third group of lines is capable of transferring data at a third maximum frequency, wherein said first maximum frequency is less than said second maximum frequency and said third maximum frequency is greater than said second maximum frequency; said apparatus comprising:

A. first means for enabling the transfer of data over said lines of said first group once during said predetermined interval;
B. second means for enabling the transfer of data over said lines of said second group a number of times during said predetermined interval substantially equal to the ratio of said second maximum frequency to said first maximum frequency; and
C. third means for enabling the transfer of data over said lines of said third group a number of times during said predetermined interval substantially equal to the ratio of said third maximum frequency to said first maximum frequency.

2. Multiplexer apparatus for enabling a plurality of communication lines for transfer of data during a predetermined interval, said lines being divided into a plurality of grouped lines, said lines of a group coupled to transfer data at different maximum frequencies, said apparatus comprising:

A. a first group of said lines for transferring data at a first maximum frequency;
B. a second group of said lines for transferring data at a second maximum frequency;
C. a third group of said lines for transferring data at a third maximum frequency, said first maximum frequency lower than said second maximum frequency and said third maximum frequency greater than said second maximum frequency;
D. first means for enabling the transfer of data over said lines of said first group once during said predetermined interval;
E. second means for enabling the transfer of data over said lines of said second group a number of times during said predetermined interval equal to the ratio of said second maximum frequency to said first maximum frequency; and
F. third means for enabling the transfer of data over said lines of said third group a number of times during said predetermined interval equal to the ratio of said third maximum frequency to said first maximum frequency.

3. Apparatus as defined in claim 2 wherein said predetermined interval includes a plurality of subintervals and wherein said third means for enabling the transfer of data includes means for enabling the transfer of data over each line of said third group of lines once during each of said subintervals.

4. Apparatus as defined in claim 3 further comprising:

A. first means for generating a line address;
B. second means for generating a line address;
C. third means for generating a line address;
D. means for enabling the transfer of data over the line addressed by said first means for generating during the first of said subintervals;
E. means for enabling the transfer of data over the line addressed by said second means for generating during each of said subintervals except said first subinterval, and if said line addressed is in said third group; and
F. means for enabling the transfer of data over the line addressed by said third means for generating during the last of said subintervals if said line addressed is in said second group.

5. Apparatus as defined in claim 4 further comprising means for enabling the transfer of data over the line addressed by said first means for generating during the subintervals other than said first subinterval and if said line addressed is in said first group.

6. Apparatus as defined in claim 3 further comprising:

A. first means for generating a line address;
B. second means for generating a line address; and
C. fourth means responsive to one of said line addresses generated by either said first or second means for generating, for enabling the transfer of data over the line addressed.

7. Apparatus as defined in claim 6 further comprising:

A. first means coupled with said fourth means for enabling, for selecting said line address generated by said first means for generating when said line addressed is in said first group; and
B. second means coupled with said fourth means for enabling, for selecting said line address generated by said second means for generating when said line addressed is in either said second group or said third group.

8. Apparatus as defined in claim 7 further comprising means included in said second means for selecting, for selecting said line address generated by said second means for generating when said line addressed during the last of said subintervals is in said third group.

9. Apparatus as defined in claim 6 further comprising:

A. third means for generating a line address; and

B. fifth means, responsive to said line address generated by said third means for generating, for enabling the transfer of data over the line addressed during the last of said sub-intervals when said line addressed is in said second group.

10. Multiplexer apparatus for enabling the transfer of data over a plurality of communication lines during a predetermined time interval, said interval divided into four equal subintervals and said communication lines divided into groups of low speed lines, medium speed lines and high speed lines, said apparatus comprising:

A. a clock source for generating repetitive clock pulses;

B. a main counter;

C. a sub scan counter;

D. means for enabling said main counter in response to a first signal;

E. means for coupling said clock pulses to increment said sub scan counter and to increment said main counter, said main counter incremented only when enabled by said first signal;

F. means for enabling the transfer of data over the line addressed;

G. means responsive to a second signal for selecting the count of said main counter to address said lines; and H. means responsive to a third signal for selecting the count of said sub scan counter to address said lines.

11. Apparatus as defined in claim 10 further comprising means for generating said first signal and said second signal during the first of said four subintervals.

12. Apparatus as defined in claim 11 further comprising means for inhibiting said first signal when said second signal is inhibited and means for inhibiting said first signal during the fourth of said subintervals if at the beginning of said fourth subinterval the line to be addressed is a high speed or medium speed line, said inhibiting of said first signal continuing during said fourth quadrant until the line to be next addressed is a low speed line.

13. Apparatus as defined in claim 11 further comprising means for generating said third signal at the end of the first, second and third subintervals if one of said lines is a high speed line.

14. Apparatus as defined in claim 11 further comprising means for generating said second signal in either said second quadrant or said fourth quadrant if the next line is to addressed is either a medium speed line or a low speed line.

15. Apparatus as defined in claim 11 further comprising means for generating said second signal in said third quadrant if the next line to be addressed is a low speed line.

16. Apparatus as defined in claim 11 further comprising means for inhibiting said first signal when said third signal is generated and comprising further means for inhibiting said first signal at the end of said third quadrant if the next line to be addressed is a medium speed or a high speed line.

17. Apparatus as defined in claim 10 further comprising:

A. a medium speed counter;

B. means responsive to a fourth signal and said second signal for selecting the count of said medium speed counter to address said line;

C. means for enabling said medium speed counter in response to a fifth signal; and D. means for coupling said clock pulses to increment said medium speed counter when said medium speed counter is enabled by said fifth signal.

18. Apparatus as defined in claim 17 further comprising:

A. means for generating said fifth signal;

B. means for inhibiting the generation of said fifth signal at the end of said third quadrant if the next line to be addressed is a medium speed or a high speed line; and C. means for continuing the inhibiting of said fifth signal during said fourth quadrant until the next line to be addressed is a low speed line.

19. Multiplexer apparatus for enabling the transfer of data over a plurality of communication lines during a predetermined time interval, said interval divided into a plurality of subintervals and said communication lines capable of including groups of low speed lines, medium speed lines and high speed lines, said apparatus comprising:

A. a memory comprising a plurality of storage locations equal in number to the number of said communications lines, each of said locations including sublocations for storing the data to be transmitted over the respective line, for receiving the data to be received over said respective line and for storing the line speed of the next sequentially numbered line;

B. first and second counter means for generating respective addresses for addressing said lines;

C. means, responsive to the number sequence of said subintervals and responsive to the line speed of said next line, for selecting the address generated by one of said counter means; and D. means for enabling the transfer of data over the line addressed by the counter means selected by said means for selecting.

20. Apparatus as defined in claim 19 further comprising:

A. means for indicating the speed of the fastest line of said plurality of lines; and B. means for coupling said means for selecting to select the address generated by one of said counter means in response to the speed of said fastest line.

21. Apparatus as defined in claim 20 further comprising:

A. third counter means for generating an address for addressing said lines; and

B. means for coupling said third counter means for selection by said means for selecting.

* * * * *